Figure 1:
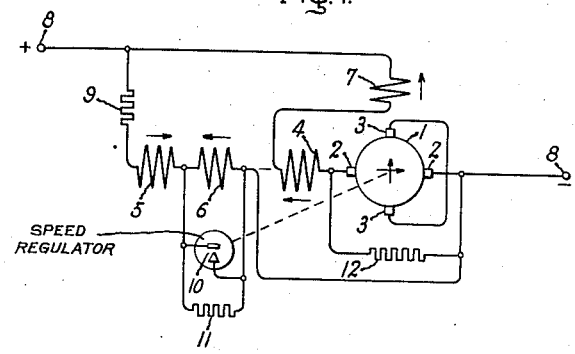

Jan. 20, 1942.          F. W. MERRILL                2,270,708
                         ELECTRIC MOTOR
                        Filed May 2, 1941

Inventor:
Frank W. Merrill,
by Harry E. Dunham
His Attorney.

Patented Jan. 20, 1942

2,270,708

UNITED STATES PATENT OFFICE 2,270,708

ELECTRIC MOTOR

Frank W. Merrill, Fort Wayne, Ind., assignor to General Electric Company, a corporation of New York Application May 2, 1941, Serial No. 391,540

12 Claims. (Cl. 171—223)

This invention relates to electric motors and more particularly to improvements in the speed regulation of direct-current motors.

A well known way of automatically regulating an electric motor so that the speed is substantially independent of variations in operating conditions, such as supply voltage, load and temperature, is to use a so-called contact governor for controlling the energization of the motor. A contact governor is a centrifugal switch, one of whose contacts is biased in one direction by a spring and in the other direction by centrifugal force. This device is driven by the motor to be regulated and its contacts are so connected to the motor that when they open and close the speed of the motor is varied. In operation the contact action is vibratory and the result is that the motor has an average speed which remains substantially constant. This average speed may, however, be adjusted to different values either by adjusting the spring pressure, or the contact separation.

Heretofore, such arrangements have been characterized by a maximum adjustable range of good regulation of about 2 to 1, a maximum accuracy of speed regulation of about ±½%, and a usual range of energy to be dissipated by the vibrating contacts of 5 to 25 watts, depending upon the application. These criteria are in some respects related to each other because, for example, the amount of energy which the vibratory contacts are required to control will dictate their size and separation, and this in turn will affect the accuracy of the regulation, and the possible adjustable range of regulation with a given spring and weight system.

In accordance with this invention there is provided a novel and simple contact-governed motor which has an adjustable range of good speed regulation of 4 to 1, an accuracy of speed regulation of ±.02% or better, and an energy dissipation by the contacts of the order of 1/10 to ½ a watt. This invention is characterized by the use of cross armature reaction to provide substantially all of the operating flux for the motor. By "cross armature reaction" is meant armature reaction which is at an angle to the axis of the main brushes, as distinguished from normal armature reaction which is substantially in line with the axis of the main brushes. This cross armature reaction is produced by current which circulates through the armature between a pair of auxiliary brushes whose axis is displaced from the axis of the main brushes. These auxiliary brushes are electrically connected by a conductor so as to provide a return path for the current which produces the cross armature reaction flux. The voltage producing this current is generated in the armature between the auxiliary brushes by the revolving rotor conductors cutting a small flux in line with the main brushes, called the control flux, which in turn is produced by means of a control winding or windings. The normal armature reaction is neutralized by a series compensating winding so that a control winding having very few ampere-turns will produce enough control flux to generate a relatively large operating flux due to the low resistance of the current path through the armature and the auxiliary brushes. Now, if the contact governor is connected so as to regulate the average current in the control field the energy dissipated on its contacts will be greatly reduced, compared to any circuit used heretofore, because of the extremely small energy required to excite the control field. Furthermore, the control field has a very low inductance so that the time constant of the circuit is greatly reduced, thus increasing the frequency of operation of the contacts and improving the accuracy of the regulation.

An object of the invention is to provide a new and improved electric motor circuit.

Another object of the invention is to provide an accurate, wide-range, long-life, automatic electric motor speed regulating system.

A further object of the invention is to provide an improved contact-governed motor.

The invention will be better understood from the following description taken in connection with the accompanying drawing and its scope will be pointed out in the appended claims.

Figure 2:
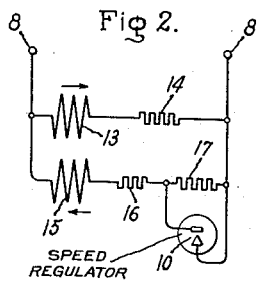
Figure 3:
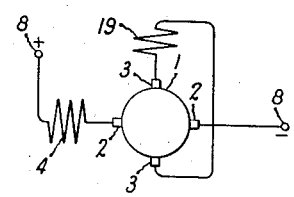
Figure 4:
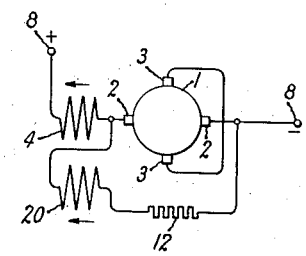

In the drawing Fig. 1 is a diagrammatic illustration of a preferred embodiment of the invention, Fig. 2 illustrates a modified control field circuit, Fig. 3 illustrates a modified motor circuit for reducing the current in the auxiliary brushes, and Fig. 4 is a modified motor connection which is more suitable for large motors.

Referring now to the drawing and more particularly to Fig. 1, the regulated motor consists of an armature 1 provided with a commutator. This armature and commutator may be similar to that found in conventional direct-current motors. Making contact with the commutator is a set of main brushes 2 and a set of auxiliary brushes 3 whose axis is displaced from the axis of the main brushes, the angle of displacement illustrated being ninety electrical degrees. The stator of the motor (not shown) is provided with a plurality of field windings. Three of these windings are arranged to send flux through the armature along the axis of the main brushes and they comprise a compensating winding 4 and a pair of opposed control windings 5 and 6. In addition there is a starting winding 7 arranged to send flux through the armature along the axis of the auxiliary brushes. The main brushes, the compensating field 4 and the starting field 7 are serially connected between a pair of input terminals 8. The control field windings 5 and 6 are serially connected with each other in a shunt circuit across the motor terminals. A resistor 9 may be connected in series with the control windings in this shunt circuit or may be omitted depending upon the size of the machine, the value of the line voltage, or the time constant desired in the control field circuit.

Connected across the control field winding 6 are the contacts of a speed governor 10. This governor may be any well-known type of contact governor. The details of one suitable type are described and claimed in Patent No. 1,795,240, granted March 3, 1931, on an application of Alfred L. Ulmer and assigned to the assignee of the present application. In this governor the contacts are biased open by the spring and are moved to closed position by centrifugal force. The contact governor is rotated by the motor and may be fastened on the end of the shaft thereof. In certain instances the impulses produced by the opening and closing of the governor contacts will be objectionably large and in that case they may be reduced by a properly proportioned resistor 11 connected across the governor contacts.

The arrows adjacent the field windings indicate the directions of their m.m.f.'s or the fluxes which they tend to produce and the arrows on the armature indicate respectively the directions of the m.m.f.'s or fluxes of the main and cross armature reactions, the former being in line with the main brushes 2 and the latter being in line with the auxiliary brushes 3.

The operation of Fig. 1, assuming resistors 11 and 12 to be omitted, is as follows: With the motor at rest the contacts of the governor 10 will be open. Then, since the compensating winding 4 produces a flux which is substantially equal and opposite to the normal armature reaction flux and the control field windings 5 and 6 produce fluxes which are substantially equal and opposite to each other, if a direct-current voltage is applied between the input terminals 8, the only flux produced in the motor will be that caused by the series starting winding 7. This winding has as few turns as are necessary to provide sufficient flux for starting purposes. In one motor which has been built, it consists of two coils of three turns each. However, as the starting or in-rush current of the motor when rated voltage is applied is usually three or four times normal full load current, the ampere-turns produced by the starting winding will be sufficient to cause the motor to start. It is preferable to have the starting winding 7 a series rather than a shunt winding because with a shunt starting winding the flux produced would remain substantially constant whereas with a series winding it has its maximum value at the instant of starting and then decreases when the motor gets under way. This latter characteristic is desirable because it reduces to a minimum all fluxes in the direction of the auxiliary brushes except the cross armature reaction flux so that, in effect, substantially all of the normal operating flux will be cross armature reaction flux which will in turn be controlled by and directly proportional to the flux of the control windings and hence under control of the regulator.

The motor, therefore, starts as an ordinary series motor with a very weak series field so that it tends to accelerate rapidly, the series field flux decreasing as the speed increases which has a further tendency to increase the speed. When the speed setting of the governor 10 is reached its contacts close thereby short circuiting the control field winding 6. The control field winding 5 will now be unopposed and will send flux through the armature in the direction of the main brushes 2. This induces a voltage in the armature between the auxiliary brushes 3 resulting in a heavy circulating current through the armature between these brushes. This heavy circulating current in turn produces a cross armature reaction flux and as the stator of the motor is so designed that it provides a relatively low reluctance return path for this flux, a very few net ampere-turns in the control field winding circuit will produce a very large amount of cross armature reaction operating flux. Furthermore, the relatively large number of ampere-turns along brush axis 3, 3 is produced in the circuit by a large current and relatively few turns so that very little inductance is involved and consequently the rate of response of the machine is very rapid. This rapid and large increase in flux will very quickly decrease the speed of the motor and as soon as the motor speed falls slightly the contacts of the governor 10 will open, thus reinserting differential control field winding 6 in the control circuit whereby the control flux falls to zero thus causing an almost instantaneous collapse of the main operating flux and another acceleration of the motor.

The starting of the motor as described above is based on the assumption that the compensating field 4 is wound so as to exactly balance the armature reaction in the direction of the load axis brushes 2, 2. It is difficult, however, to proportion this winding for exact 100% compensation. If it is slightly undercompensated so that the rotor m.m.f. predominates no harm will be done, as the rotor flux produced by the starting current inrush will be in the same direction as that produced by main control field 5. Such flux will generate a cross armature reaction flux in the same direction as that set up by series field 7 and assist the starting. If field 4 is wound with too many turns, however, so as to be overcompensated it will produce a flux in a direction opposite to that of main control field 5. Since, with the regulator contacts open, 5 and 6 are in exact opposition, with net flux of zero, overcompensation will produce reverse flux in the 2, 2 axis of the motor which will generate a cross armature reaction flux in opposition to that of series starting field 7. The amplifying factor of this machine is such that one or two ampere turns in the 2, 2 axis (control or load axis) may easily produce ten ampere-turns in the 3, 3 or cross armature excitation axis, and as the starting series field 7 only has three or four turns per coil, a turn too many in winding 4 may easily neutralize the starting series field. What actually happens is that the motor will start and run in a direction of rotation depending upon the direction of the flux of winding 7, but if the field 4 is overcompensated an opposition flux will be generated in the excitation axis 3, 3 at some slow speed far below the lowest regulator setting. The greater the compensation the slower this speed will be. The opposition flux will almost but not quite wipe out the flux of field 7 and the motor will run at a subnormal speed and take a huge input current. A few minutes of such operation would burn out the windings.

To prevent this dangerous starting condition field 4 is made 2% or 3% undercompensated. The motor then starts with the characteristic rush and acceleration of a series motor.

Under extreme conditions, however, when it is desired to have the motor bring up the greatest possible load to the maximum regulating speed, under minimum voltage and temperature conditions it is essential that the control flux or any other flux in the 2, 2 axis reduce to zero when the regulator contacts are open. This means that the field 4, normally wound slightly undercompensated, must be brought up to 100% so as to reduce the cross armature reaction excitation m.m.f. to zero. This can be done by connecting a resistor 12 across brushes 2, 2. Under conditions of minimum voltage on brushes 2, 2, and current input through winding 4 and armature brushes 2, 2 corresponding to full load torque at maximum speed, the value of resistor 12 is such as to draw just enough extra current through winding 4 to bring the compensation to 100%. At this time the regulator contacts are wide open. Now, it is evident that for higher line voltages or lighter load currents the current drawn by resistor 12 will produce considerable overcompensation, but this will do no harm as the regulator will automatically strengthen control field 5 just enough more to overcome it.

At the time of starting, which is the critical condition, resistor 12 will draw very little current, as the resistance drop in field 4 on the starting current inrush will cut the drop between the brushes 2, 2 to about one-half normal value. Also the small current drawn by resistor 12 will be a negligible percentage of the starting current and will have substantially no effect on the undercompensation of field 4 until the machine has come up to speed, the regulator has taken control, the input current has dropped to normal, and the voltage across brushes 2, 2 has risen almost to line voltage value.

Unit 12 is therefore a shunt resistor for bringing compensation to 100% only because of the necessity of getting maximum torque and speed out of the motor under minimum voltage conditions. Only in aircraft or similar applications where the very greatest power must be obtained from the very lightest weight is it necessary to use the expedient of resistor 12 and to reduce both control flux and cross armature excitation flux to zero. Where there is more latitude as to speed range or the motor may be made a little oversize, the unit 12 may be omitted and unit 11 added in parallel with the regulator to increase its steadiness of operation and to further reduce the watts dissipated by the regulator contacts.

It should also be noted that when differential control field 6 is not used and when regulation is obtained by connecting the regulator across unit 11 only, unit 12 has the additional function of keeping unit 11 to a low value compared to the resistance of field 5, to insure satisfactory regulation. Here the overcompensating effect of unit 12 produces a more or less fixed opposition control flux which makes it necessary to weaken field 5 to a much less degree to produce a given speed than would be the case if there were no opposition flux. This function will be described more fully later.

One of the purposes of resistor 9 is to take up excess voltage of the supply source. This is sometimes necessary in small motors operating on voltages such as 115 to 230 because it is usually necessary to limit the smallness of wire with which the control fields are wound to some such value as .0071 inch in diameter and wherever the line voltage is so high as to require a smaller size wire than this the excess voltage is taken up by a series resistor. This increases the total losses in the control circuit but these are so low anyway that it is not worth while to sacrifice reliability or increase the cost of winding which would be brought about by the use of finer wire. Another still more important purpose of the resistor 9 is to produce a further reduction of the time constant of the regulator circuit.

There is also another effect of resistance 9, which should be noted, as follows: If the resistor 9 were not present, the current in control field winding 5 would double each time the contacts of governor 10 closed, since the resistance of field winding 6 is usually made equal to that of field winding 5, and the closing of the governor contacts would reduce the resistance of the circuit to one-half. However, if resistor 9 has a value which is substantially greater than the resistance of the control field windings 5 and 6, then the insertion and removal of the differential field winding 6 will produce relatively slight changes in resistance of the total control circuit and consequently relatively slight changes in the current of the control circuit. The change in flux, however, will be exactly the same as before, going from a value of 100% when the governor contacts are closed to a value of zero when the contacts are open. If, for example, the resistor 9 has 10,000 ohms and each of the control fields has a resistance of one ohm, then the opening and closing of the governor contacts will cause no substantial change in field current but the control flux will still fall to zero due to turn-opposition. Consequently, as the series resistor 9 is increased the vibrating control becomes more and more the pure switching of turn opposition and less and less flux change by virtue of change of field current.

If the impulses produced by the opening and closing of the governor contacts are more powerful than are needed for proper regulation these impulses may be reduced to any desired value by the use of resistor 11 connected in parallel with the governor contacts. This resistor by-passes some of the contact current and thus the regulator contacts control only the marginal amount of current necessary for regulation. This still further reduces the energy required to be handled by the governor contacts.

At low speed settings of the governor the net control flux produced by the windings 5 and 6 is relatively large whereas at high speed settings of the governor the net control flux is relatively small. The minium speed which it would be possible to obtain with the governor would be one in which the contacts remained closed all of the time and the maximum possible speed would be obtained when the contacts of the governor remained open all of the time.

By reversing the connections or polarity of the starting winding 7, the direction of rotation of the motor will reverse but its regulating characteristics will be unchanged and it will operate equally well in either direction.

The presence of the differential field winding 6 and of the resistors 9 and 12 is not essential to my invention in its broader aspects. Thus, without these elements the circuit will operate very satisfactorily over a speed range of from about 3,000 to 5,000 R. P. M. In this case the change in control excitation is produced by changes in current in the control field winding 5 as a result of the insertion and removal of the resistor 11 by the intermittent opening and closing of the governor contacts. For higher speeds it is necessary to reduce the current in the control field 5 to near zero and this would necessitate the removal of the resistor 11 in order to obtain infinite resistance when the governor contacts open. Under such conditions unstable regulator operation is produced and very high peak voltages are generated across its contacts. In some instances it is possible to make the circuit operable at these higher speeds by the use of properly proportioned capacitance and resistance across the contacts. It is a general principle of speed regulation by vibratory contacts, however, that more stable operation is secured as the resistance across which the contacts operate is decreased. Experience has shown that good results are obtained when this resistance is not more than two or three times that of the field, and even better if it is equal to or less than that of the field. The change of field current is also less when the contacts open across a low resistance.

The addition of resistor 12 considerably improves the situation as its effect in strengthening compensating field 4 by the shunt current drawn therethrough overcompensates the motor, which produces a reverse flux in the control field axis in the same direction as would be produced by differential control field 6. The effect of this is that a finite and not too large value of resistance 11 will suffice to weaken field 5 sufficiently to bring the net control flux to zero and enable stable regulation to be obtained with this circuit. However, when the differential field winding 6 is not used the resistor 12 must have a considerably lower value so that the change in degree of compensation is more marked. This more marked change in degree of compensation aids the main control field winding 5 in producing close or accurate regulation over a wide change of settings with a low value of resistance 11, as explained above.

When the differential field winding 6 is employed the resistor 12 is used primarily to bring the compensation up to 100% under the highest speed, low line voltage, full load conditions. Consequently, under these conditions substantially the only flux is the flux produced by the series winding 7 and the cross armature reaction flux will fall substantially to zero because of the complete compensation coupled with the fact that windings 5 and 6 are normally in circuit and normally neutralize each other. Consequently, at this top speed, minimum voltage, maximum load condition the machine is a straight series motor; at all higher voltages, lighter loads, or lower speed settings a controlled cross armature flux is added to the series field flux by the action of the regulator to hold the speed constant at the value imposed by the regulator setting.

In the modification shown in Fig. 2 a control field winding 13 is connected across the motor terminals in series with an excess voltage consuming resistor 14. In parallel therewith is a main control field winding 15 which is in opposition to and always stronger than the field winding 13. In series with the main field winding 15 are a resistor 16 and a regulating resistor 17 across which the contacts of the governor operate. The resistor 16 is for the purpose of taking up excess voltage and reducing the time constant of the circuit of the field winding 15. The resistance 18 is made just great enough so that when the regulator contacts open the motor speed will rise about 10% above the desired point under conditions of minimum line voltage, maximum load and minimum temperature. The field winding 13 and the value of resistance 16 are so adjusted that when the contact points close the speed will drop about 10% below the desired point under conditions of maximum voltage, minimum load and maximum temperature.

In the modification shown in Fig. 3 a winding 19 has been connected in the return conductor between the auxiliary brushes 3. The purpose of this winding is to obtain the same number of ampere turns of cross armature reaction excitation by means of a greater number of turns and a fewer number of amperes through the auxiliary brushes so as to prolong the life of these brushes by reducing the current that they are required to commutate and also to reduce the current density in the rotor conductors by reducing the amount of exciting current superposed on the load current in part of the rotor.

In the modification shown in Fig. 4 an additional field winding 20 has been connected in series with the resistor 12. This is desirable in the larger size motors as it reduces the energy waste in the resistor 12, the change in compensation being produced mainly by the change of a small current through the relatively large number of turns of the winding 20 rather than by an increase in current through the winding 4 taken by the resistor 12.

While there have been shown and described particular embodiments of this invention, it will be obvious to those skilled in the art that various changes and modifications may be made therein without departing from the invention and, therefore, it is aimed in the appended claims to cover all such changes and modifications as fall within the true spirit and scope of the invention.

What I claim as new and desire to secure by Letters Patent of the United States, is:

1. In combination, a direct-current commutator type motor having a set of main brushes, a set of auxiliary brushes whose axis is displaced from the axis of said main brushes, means including a conductor for completing a local circuit which contains said auxiliary brushes, a control field winding and a compensating field winding for producing magnetomotive forces along the axis of said main brushes, and a starting field winding for producing a flux along the axis of said auxiliary brushes, said compensating winding and starting winding being serially connected with said main brushes between a pair of input terminals, said compensating winding having a magnetomotive force substantially equal and opposite to the armature reaction magnetomotive force along the axis of said main brushes whereby the effective magnetomotive force of said control winding is substantially independent of the input current to said motor, said starting winding having substantially the minimum number of turns necessary to cause said motor to start under full load when minimum voltage is impressed on said input terminals whereby after said motor gains speed the excitation produced by said starting winding is automatically reduced and substantially all the normal excitation of said motor is obtained from the ampere-turns of the local circuit containing said auxiliary brushes, the current in said local circuit being produced by the voltage induced in said armature between said auxiliary brushes by flux along the axis of said main brushes.

2. In combination, a direct-current commutator type motor having a set of main brushes, a set of auxiliary brushes whose axis is displaced from the axis of said main brushes, means including a conductor for completing a local circuit which contains said auxiliary brushes, a control field winding and a compensating field winding for producing magnetomotive forces along the axis of said main brushes, and a starting field winding for producing flux along the axis of said auxiliary brushes, said compensating winding being serially connected with said main brushes between a pair of input terminals for the motor, said compensating winding having a magnetomotive force substantially equal and opposite to the armature reaction magnetomotive force along the axis of said main brushes whereby the effective magnetomotive force of said control winding is substantially independent of the input current to said motor, said starting winding being connected to the circuit including said main brushes and having substantially the minimum number of turns necessary to cause said motor to start under full load when minimum voltage is impressed on said input terminals whereby after said motor gains speed its principal excitation is obtained from the ampere turns of the local circuit containing said auxiliary brushes, the current in said last-mentioned circuit being produced by the voltage induced in said armature between said auxiliary brushes by flux along the axis of said main brushes.

3. In combination, a direct-current commutator type motor having a set of main brushes, a set of auxiliary brushes whose axis is displaced from the axis of said main brushes, means including a conductor for completing a local circuit which contains said auxiliary brushes, a control field winding and a compensating field winding for producing magnetomotive forces along the axis of said main brushes, a starting field winding for producing a flux along the axis of said auxiliary brushes, said compensating winding and starting winding being serially connected with said main brushes between a pair of input terminals, said compensating winding having a magnetomotive force substantially equal and opposite to the armature reaction magnetomotive force along the axis of said main brushes whereby the effective magnetomotive force of said control winding is substantially independent of the input current to said motor, said starting winding having substantially the minimum number of turns necessary to cause said motor to start under full load when minimum voltage is impressed on said input terminals whereby after said motor gains speed the excitation produced by said starting winding is automatically reduced and substantially all the normal excitation of said motor is obtained from the ampere-turns of the local circuit containing said auxiliary brushes, the current in said local circuit being produced by the voltage induced in said armature between said auxiliary brushes by flux along the axis of said main brushes, and an automatic regulator for controlling the effectiveness of said control winding.

4. In combination, a direct-current commutator type motor having a set of main brushes, a set of auxiliary brushes whose axis is displaced from the axis of said main brushes, means including a conductor for completing a local circuit which contains said auxiliary brushes, a control field winding and a compensating field winding for producing magnetomotive forces along the axis of said main brushes, said compensating winding being serially connected with said main brushes between a pair of input terminals for said motor, said compensating winding having a magnetomotive force substantially equal and opposite to the armature reaction magnetomotive force along the axis of said main brushes whereby the effective magnetomotive force of said control winding is substantially independent of the input current to said motor, and means including a centrifugal vibratory contact speed regulator for controlling the effectiveness of said control winding.

5. In combination, a direct-current commutator type motor having a set of main brushes, a set of auxiliary brushes whose axis is displaced from the axis of said main brushes, means including a conductor for completing a local circuit which contains said auxiliary brushes, a control field winding and a compensating field winding for producing magnetomotive forces along the axis of said main brushes, a starting field winding for producing a flux along the axis of said auxiliary brushes, said compensating winding and starting winding being serially connected with said main brushes between a pair of input terminals, said compensating winding having a magnetomotive force substantially equal and opposite to the armature reaction magnetomotive force along the axis of said main brushes whereby the effective magnetomotive force of said control winding is substantially independent of the input current to said motor, said starting winding having substantially the minimum number of turns necessary to cause said motor to start under full load when minimum voltage is impressed on said input terminals whereby after said motor gains speed the excitation produced by said starting winding is automatically reduced and substantially all the normal excitation of said motor is obtained from the ampere turns of the circuit containing said auxiliary brushes, the current in said circuit being produced by the voltage induced in said armature between said auxiliary brushes by flux along the axis of said main brushes, said control winding being connected in shunt circuit relation to the circuit including said main brushes, an impedance in series circuit relation with said control winding, and a vibratory contact speed regulator having its contacts connected across said impedance.

6. In combination, a direct-current commutator type motor having a set of main brushes, a set of auxiliary brushes whose axis is displaced from the axis of said main brushes, means including a conductor for completing a local circuit which contains said auxiliary brushes, a main control field winding and a compensating field winding for producing magnetomotive forces along the axis of said main brushes, a starting field winding for producing flux along the axis of said auxiliary brushes, said compensating winding being serially connected with said main brushes between a pair of input terminals for the motor, said compensating winding having a magnetomotive force substantially equal and opposite to the armature reaction magnetomotive force along the axis of said main brushes whereby the effective magnetomotive force of said main control winding is substantially independent of the input current to said motor, said starting winding being connected to the circuit including said main brushes and having substantially the minimum number of turns necessary to cause said motor to start under full load when minimum voltage is impressed on said input terminals whereby after said motor gains speed its principal excitation is obtained from the ampere turns of the circuit containing said auxiliary brushes, the current in said last-mentioned circuit being produced by the voltage induced in said armature between said auxiliary brushes by flux along the axis of said main brushes, a differential control field winding connected in series with said main control field winding, said main and differential control field windings having equal numbers of turns, and a vibratory contact regulator having its contacts connected across said differential control field winding.

7. In combination, a direct-current commutator type motor having a set of main brushes, a set of auxiliary brushes whose axis is displaced from the axis of said main brushes, means including a conductor for completing a local circuit which contains said auxiliary brushes, a main control field winding and a compensating field winding for producing magnetomotive forces along the axis of said main brushes, a starting field winding for producing flux along the axis of said auxiliary brushes, said compensating winding being serially connected with said main brushes between a pair of input terminals for the motor, said compensating winding having a magnetomotive force substantially equal and opposite to the armature reaction magnetomotive force along the axis of said main brushes whereby the effective magnetomotive force of said main control winding is substantially independent of the input current to said motor, said starting winding being connected to the circuit including said main brushes and having substantially the minimum number of turns necessary to cause said motor to start under full load when minimum voltage is impressed on said input terminals whereby after said motor gains speed its principal excitation is obtained from the ampere turns of the circuit containing said auxiliary brushes, the current in said last-mentioned circuit being produced by the voltage induced in said armature between said auxiliary brushes by flux along the axis of said main brushes, a differential control field winding connected in series with said main control field winding, said main and differential control field windings having equal numbers of turns, a vibratory contact regulator having its contacts connected across said differential control field winding, and a resistor connected in series with said control field windings and having an ohmic value many times greater than the combined ohmic value of both of said control field windings.

8. In combination, a direct-current commutator type motor having a set of main brushes, a set of auxiliary brushes whose axis is displaced from the axis of said main brushes, means including a conductor for completing a local circuit which contains said auxiliary brushes, a control field winding and a compensating field winding for producing magnetomotive forces along the axis of said main brushes, said compensating winding being serially connected with said main brushes between a pair of input terminals, said compensating winding having a magnetomotive force which is opposite to the armature reaction magnetomotive force along the axis of said main brushes and which is a few per cent less than said armature reaction magnetomotive force, an automatic regulator for controlling the effectiveness of said control winding, and a resistor connected in series circuit relation with said compensating winding and in shunt circuit relation with said main brushes.

9. In combination, an electric motor having a control field circuit, said control field circuit including a main field winding and a differential field winding connected in series, said field windings having substantially equal numbers of turns, and a vibratory contact regulator having its contacts connected across the differential field winding.

10. In combination, an electric motor having a control field circuit, said control field circuit consisting of a resistor, a main field winding and a differential field winding all connected in series, said resistor having an ohmic value many times greater than the combined ohmic values of said field windings, said field windings having equal turns, and a vibratory contact regulator having its contacts connected across the differential field winding.

11. In combination, an electric motor having a control field circuit, said control field circuit consisting of a resistor, a main field winding and a differential field winding all connected in series, said resistor having an ohmic value many times greater than the combined ohmic values of said field windings, said field windings having equal turns, a vibratory contact regulator having its contacts connected across the differential field winding, and a resistor connected in parallel with the regulator contacts.

12. In combination, a direct-current commutator type motor having a set of main brushes, a set of auxiliary brushes whose axis is displaced from the axis of said main brushes, means including a conductor for completing a local circuit which contains said auxiliary brushes, a control field winding and a compensating field winding for producing magnetomotive forces along the axis of said main brushes, and a starting field winding for producing a flux along the axis of said auxiliary brushes, said compensating winding and said starting winding being serially connected with said main brushes between a pair of input terminals, said compensating winding having a magnetomotive force substantially equal and opposite to the armature reaction magnetomotive force along the axis of said main brushes and which is of the order of two per cent less in magnitude than said armature reaction whereby the effective magnetomotive force of said control winding is substantially independent of the input current to said motor, said starting winding having substantially the minimum number of turns necessary to cause said motor to start under full load when minimum voltage is impressed on said input terminals whereby after said motor gains speed the excitation produced by said starting winding is automatically reduced and substantially all the normal excitation is obtained from the ampereturns of the circuit containing said auxiliary brushes, the current in said circuit being produced by the voltage induced in said armature between said auxiliary brushes by flux along the axis of said main brushes, means for varying the effectiveness of said control winding from a maximum value substantially to zero, and means for bringing the compensation produced by said compensating winding up to 100 per cent after the motor starts and when the effectiveness of said control field winding is substantially zero, the load on said motor is substantially equal to full load and minimum voltage is applied to said input terminals.

FRANK W. MERRILL.